US008607498B1

(12) United States Patent
Smith et al.

(10) Patent No.: US 8,607,498 B1
(45) Date of Patent: Dec. 17, 2013

(54) FISHING BAIT HOLDING APPARATUS

(76) Inventors: Dirk J. Smith, Slinger, WI (US); Shelly M. Smith, Slinger, WI (US)

(*) Notice: Subject to any disclaimer, the term of this patent is extended or adjusted under 35 U.S.C. 154(b) by 420 days.

(21) Appl. No.: 12/905,243

(22) Filed: Oct. 15, 2010

(51) Int. Cl.
*A01K 97/05* (2006.01)
(52) U.S. Cl.
USPC ............... 43/56; 62/457.2; 62/371; 62/430; 62/438
(58) Field of Classification Search
USPC ........ 43/55–57; 62/457.2, 371, 430, 437, 438
See application file for complete search history.

(56) References Cited

U.S. PATENT DOCUMENTS

| | | | | | |
|---|---|---|---|---|---|
| 1,152,629 A | * | 9/1915 | Higgins | ........................... | 62/371 |
| 1,159,399 A | * | 11/1915 | Long | ................................ | 43/56 |
| 1,163,836 A | * | 12/1915 | Long | ................................ | 43/56 |
| 1,369,367 A | * | 2/1921 | Thomson | ...................... | 62/457.2 |
| 1,478,179 A | * | 12/1923 | Evermann | .......................... | 43/56 |
| 1,579,560 A | * | 4/1926 | Moore | ............................... | 43/55 |
| 1,721,311 A | * | 7/1929 | Muenchen | .................... | 62/457.3 |
| 2,673,454 A | * | 3/1954 | Gallie et al. | ....................... | 43/56 |
| 2,680,424 A | * | 6/1954 | Brown | ............................... | 43/55 |
| 2,716,834 A | * | 9/1955 | De Bonville et al. | ............. | 43/55 |
| 2,837,860 A | * | 6/1958 | Norling | ............................. | 43/56 |
| 2,850,885 A | * | 9/1958 | Mohr et al. | ..................... | 62/372 |
| 2,870,932 A | * | 1/1959 | Davis | ................................ | 43/56 |
| 2,912,785 A | * | 11/1959 | Nudell | ............................. | 43/56 |
| 2,962,835 A | * | 12/1960 | Clark | ................................ | 43/56 |
| 3,161,031 A | * | 12/1964 | Flannery | ..................... | 62/457.4 |
| 3,205,677 A | * | 9/1965 | Stoner | .......................... | 62/457.3 |
| 3,205,678 A | * | 9/1965 | Stoner | ............................... | 62/371 |
| 3,302,428 A | * | 2/1967 | Paquin et al. | ..................... | 62/371 |
| 3,344,552 A | * | 10/1967 | Glasco | ............................... | 43/56 |
| 3,394,562 A | * | 7/1968 | Coleman | ...................... | 62/457.3 |
| 3,406,532 A | * | 10/1968 | Bridges et al. | ................ | 62/457.2 |
| 3,452,469 A | * | 7/1969 | White | ................................ | 43/55 |
| 3,463,140 A | * | 8/1969 | Rollor, Jr. | .................... | 62/457.3 |
| 3,566,836 A | * | 3/1971 | Elfert | ................................ | 43/55 |
| 3,603,106 A | * | 9/1971 | Ryan et al. | ....................... | 62/371 |
| 3,654,773 A | * | 4/1972 | White | .............................. | 62/371 |
| 3,715,895 A | * | 2/1973 | Devlin | ............................ | 62/438 |
| 3,751,845 A | * | 8/1973 | van Leeuwen | ..................... | 43/56 |
| 3,807,194 A | * | 4/1974 | Bond | ............................... | 62/371 |
| 3,831,310 A | * | 8/1974 | Frangullie | ......................... | 43/56 |
| 3,882,628 A | * | 5/1975 | Stouder | .............................. | 43/55 |
| 4,030,226 A | * | 6/1977 | Shelton et al. | .................... | 43/55 |
| 4,183,226 A | * | 1/1980 | Moore | ......................... | 62/457.4 |

(Continued)

FOREIGN PATENT DOCUMENTS

| JP | 05056735 A | * | 3/1993 | ............. A01K 97/05 |
|---|---|---|---|---|
| JP | 10215746 A | * | 8/1998 | ............. A01K 97/05 |

(Continued)

*Primary Examiner* — Darren W Ark

(57) ABSTRACT

A fishing bait holding apparatus includes a container that has a bottom wall and a perimeter wall that is attached to and extends upwardly from the bottom wall. The perimeter wall has an upper edge defining an access opening into the container. A liner is removably positioned within the container. The liner has a lower wall and peripheral wall that is attached to and extends upwardly from the lower wall. The lower and peripheral walls each include an outer layer enclosing an interior space. A fluid is positioned within the interior space. The fluid may be chilled and the liner placed in the container to cool an area enclosed by the container. The container can be cooled with the liner such that fishing bait positioned in the container is cooled by the liner.

5 Claims, 4 Drawing Sheets

(56) References Cited

U.S. PATENT DOCUMENTS

| | | | | |
|---|---|---|---|---|
| 4,347,713 A * | 9/1982 | Morrison et al. | | 62/371 |
| 4,357,809 A * | 11/1982 | Held et al. | | 62/457.4 |
| 4,502,295 A * | 3/1985 | Toledo-Pereyra | | 62/457.1 |
| 4,513,525 A * | 4/1985 | Ward et al. | | 43/56 |
| 4,531,381 A * | 7/1985 | Toro et al. | | 62/372 |
| 4,603,503 A * | 8/1986 | Haney | | 43/56 |
| 4,638,645 A * | 1/1987 | Simila | | 62/371 |
| 4,646,682 A * | 3/1987 | Wilson | | 119/6.7 |
| 4,697,380 A * | 10/1987 | Fenske | | 43/55 |
| 4,782,670 A * | 11/1988 | Long et al. | | 62/430 |
| 4,815,416 A * | 3/1989 | Wolff | | 43/55 |
| 4,864,769 A * | 9/1989 | Sandahl | | 43/56 |
| 4,882,872 A * | 11/1989 | Todd | | 43/56 |
| 5,042,260 A * | 8/1991 | George, Sr. | | 62/457.2 |
| 5,109,625 A * | 5/1992 | Skrede | | 43/56 |
| 5,319,877 A * | 6/1994 | Hagan | | 43/56 |
| 5,507,114 A * | 4/1996 | Stricker | | 43/55 |
| 5,586,406 A * | 12/1996 | Lin et al. | | 43/56 |
| 5,619,867 A * | 4/1997 | Slaughter | | 62/457.2 |
| 6,003,329 A * | 12/1999 | Stanton, Jr. | | 43/56 |
| D425,600 S * | 5/2000 | Pas et al. | | D22/136 |
| 6,119,476 A * | 9/2000 | Slaughter et al. | | 62/457.2 |
| 6,151,910 A * | 11/2000 | Hazen | | 62/457.2 |
| 6,237,765 B1 * | 5/2001 | Hagen et al. | | 43/55 |
| RE37,213 E * | 6/2001 | Staggs | | 62/457.3 |
| D444,203 S * | 6/2001 | Leclair et al. | | D22/136 |
| 6,357,169 B1 * | 3/2002 | Gouge | | 43/56 |
| 6,415,623 B1 * | 7/2002 | Jennings et al. | | 62/457.2 |
| 6,460,287 B1 * | 10/2002 | Louie | | 43/55 |
| 6,783,018 B1 * | 8/2004 | Rondeau | | 43/56 |
| 7,377,071 B1 * | 5/2008 | Thompson | | 43/56 |
| 2002/0020104 A1 * | 2/2002 | Kolar et al. | | 43/55 |
| 2005/0268527 A1 * | 12/2005 | Beech | | 43/55 |
| 2005/0279014 A1 * | 12/2005 | Beech | | 43/55 |
| 2006/0016119 A1 * | 1/2006 | Ashburn et al. | | 43/56 |

FOREIGN PATENT DOCUMENTS

| | | | | |
|---|---|---|---|---|
| JP | 2001148986 A * | 6/2001 | | A01K 97/05 |
| JP | 2002186393 A * | 7/2002 | | A01K 97/05 |
| JP | 2003153644 A * | 5/2003 | | A01K 97/05 |

* cited by examiner

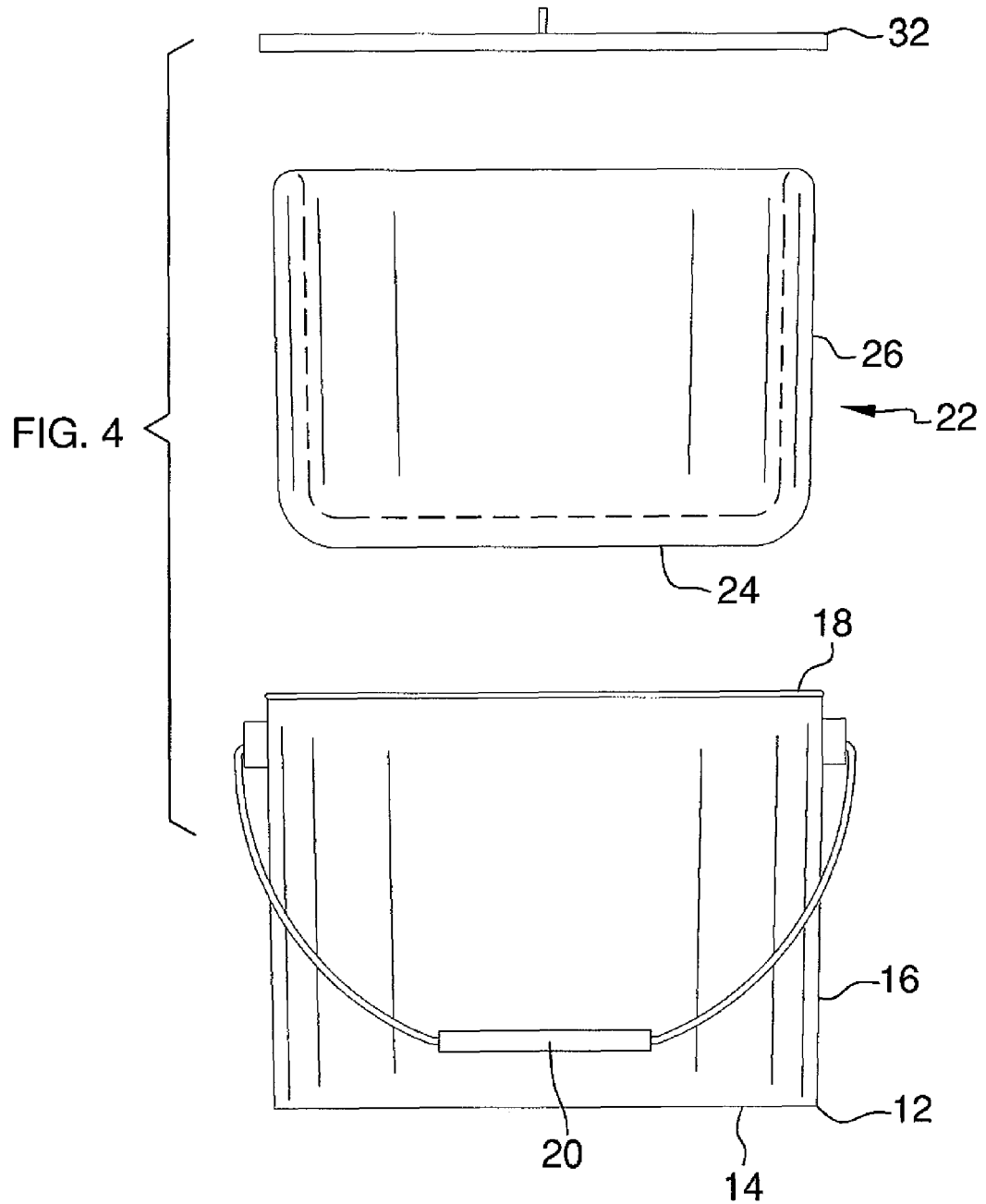

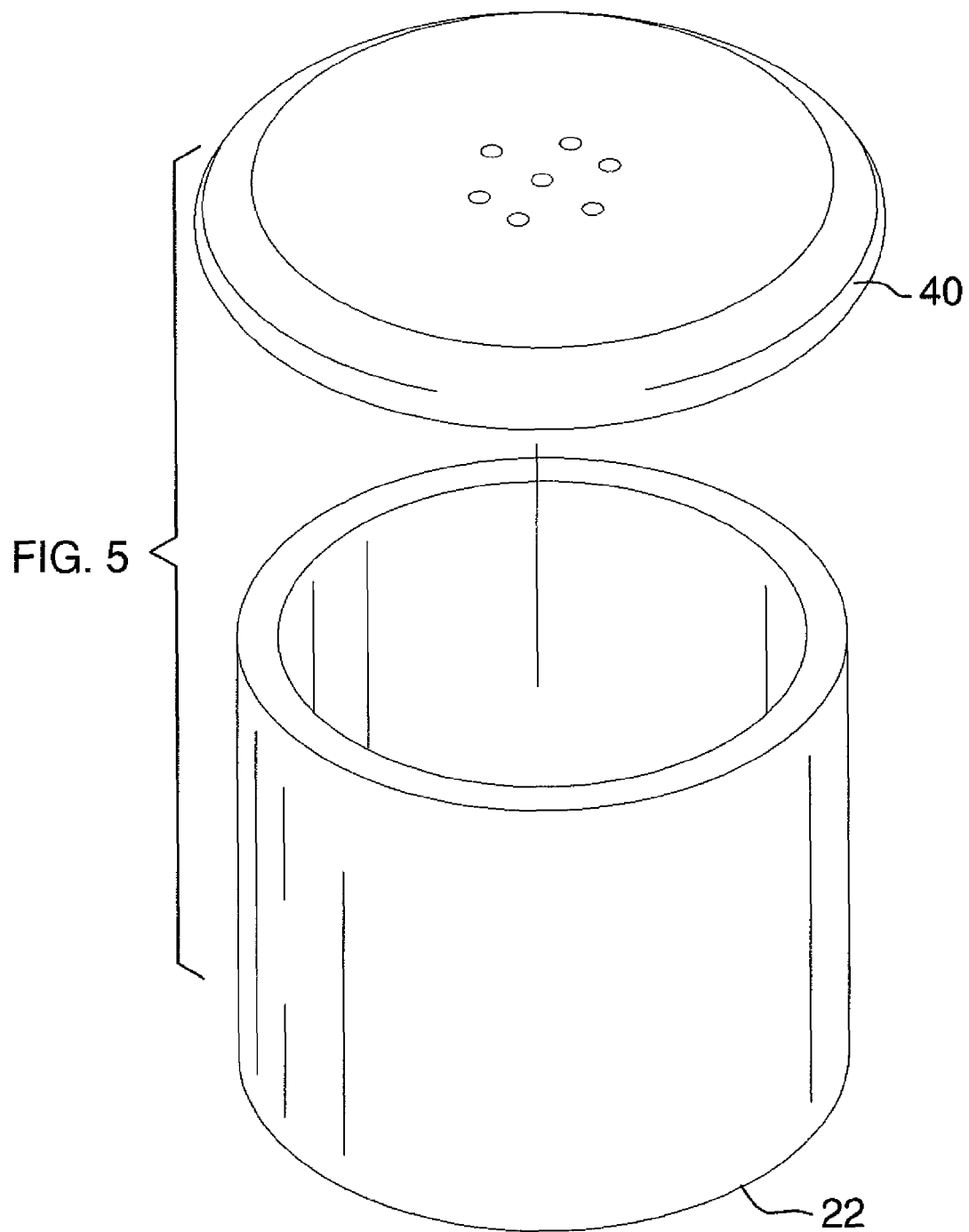

FISHING BAIT HOLDING APPARATUS

BACKGROUND OF THE DISCLOSURE

Field of the Disclosure

The disclosure relates to fishing bait transporting devices and more particularly pertains to a new fishing bait transporting device for retaining fishing bait in a cooled state.

SUMMARY OF THE DISCLOSURE

An embodiment of the disclosure meets the needs presented above by generally comprising a container that has a bottom wall and a perimeter wall that is attached to and extends upwardly from the bottom wall. The perimeter wall has an upper edge defining an access opening into the container. A liner is removably positioned within the container. The liner has a lower wall and peripheral wall that is attached to and extends upwardly from the lower wall. The lower and peripheral walls each include an outer layer enclosing an interior space. A fluid is positioned within the interior space. The fluid may be chilled and the liner placed in the container to cool an area enclosed by the container. The container can be cooled with the liner such that fishing bait positioned in the container is cooled by the liner.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 4 is a side exploded view of an embodiment of the disclosure.

FIG. 5 is a top perspective view of an embodiment of the disclosure.

DESCRIPTION OF THE PREFERRED EMBODIMENT

Figure 1:
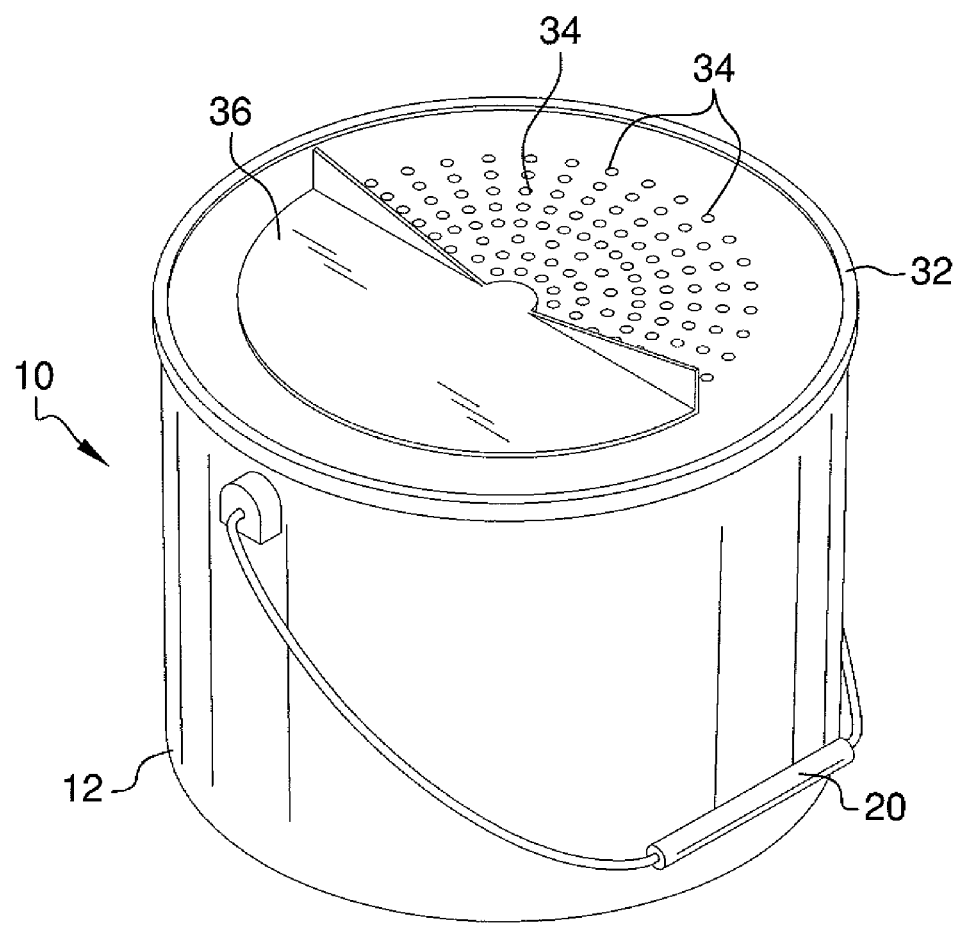
FIG. 1 is a top perspective! view of a fishing bait holding apparatus according to an embodiment of the disclosure.
Figure 2:
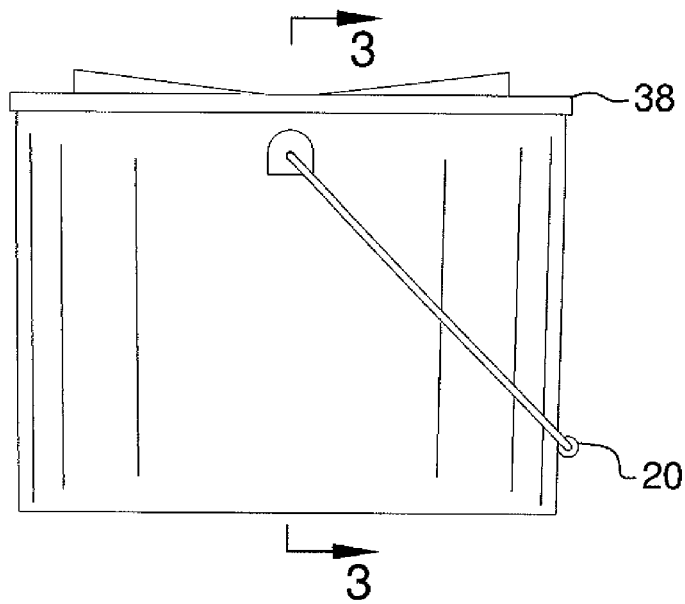
FIG. 2 is a front view of an embodiment of the disclosure.
Figure 3:
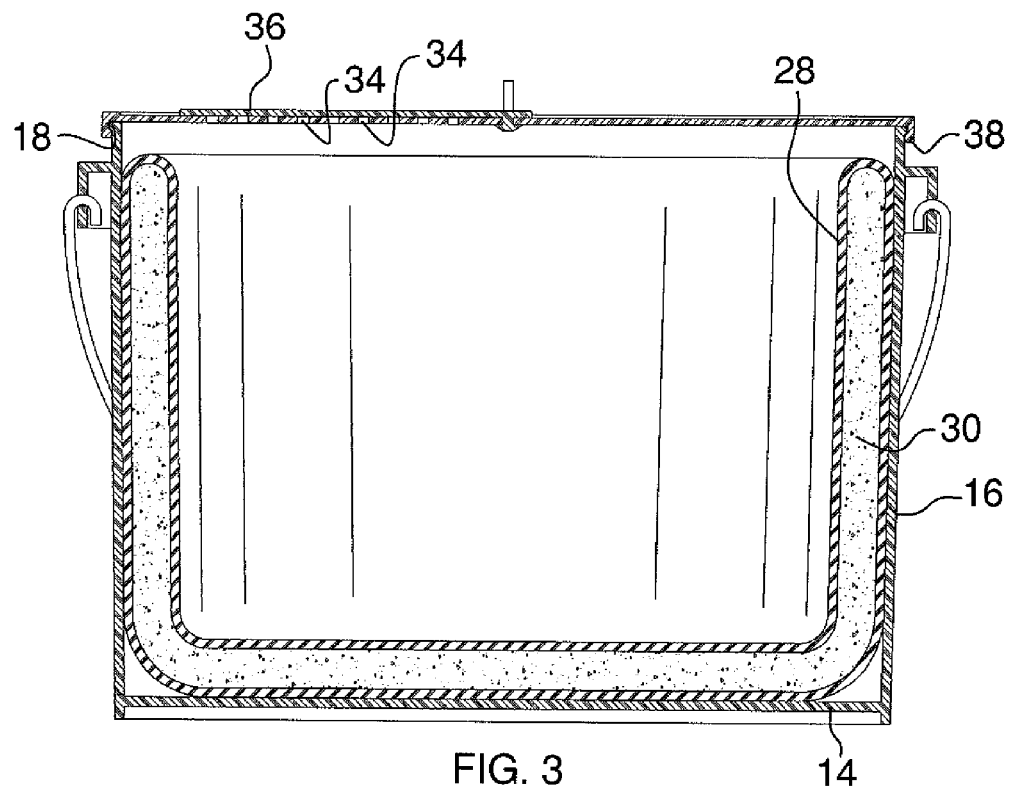
FIG. 3 is a cross-sectional view of an embodiment of the disclosure taken along line 3-3 of FIG. 2.

With reference now to the drawings, and in particular to FIGS. 1 through 5 thereof, a new fishing bait transporting device embodying the principles and concepts of an embodiment of the disclosure and generally designated by the reference numeral 10 will be described.

As best illustrated in FIGS. 1 through 5, the fishing bait holding apparatus 10 generally comprises a container 12 that has a bottom wall 14 and a perimeter wall 16 attached to and extending upwardly from the bottom wall 14. The perimeter wall 16 has an upper edge 18 defining an access opening into the container 12. A handle 20 is coupled to the container 12.

A liner 22 is removably positioned within the container 12. The liner 22 is unattached to the container 12. The liner 22 has a lower wall 24 and peripheral wall 26 that is attached to and extends upwardly from the lower wall 24. The lower 24 and peripheral 26 walls each include an outer layer 28 enclosing an interior space. A fluid 30, such as gel, is positioned within the interior space. The fluid 30 may be chilled and the liner 22 placed in the container 12 to cool an area enclosed by the container 22. The lower wall 24 has a size and shape to abut and cover the bottom wall 14 such that the peripheral wall 26 abuts and is coextensive with an inner surface of the perimeter wall 16. The liner 22 is comprised of a plastic or elastomer and is at least semi-rigid so that it generally holds its shape.

A lid 32 is removably positioned on the container 12 and releasably engages the upper edge 18 to close the access opening. The lid 32 has a plurality of air apertures 34 extending therethrough. A panel 36 is pivotably coupled to the lid 32. The panel 36 is positionable in a closed position covering the air apertures 34 or positionable in an open position exposing the air apertures 34. The lid 32 includes a flange 38 frictionally engaging the perimeter wall 16 and forming a seal between the lid 32 and the container 12.

In use, the liner 22 is chilled in either a refrigerator or freezer and then placed in the container 12 so that the container 12 is then cooled. Fishing bait, which may include minnows, leaches, worms and the like are then placed in the container 12 along with either water or soil depending on the bait. The bait is cooled by the liner 22 to shield it from the affects of the sun striking the container 12 and from being placed in a warm area. Colder bait tends to live longer and therefore the container 12 and liner 22 will retain the bait in a viable state longer than without the liner. FIG. 5 shows an embodiment wherein only the liner 22 is used by itself without the container 12 and this manner the liner 22 will serve as the complete holding vessel. This embodiment may also include its own covering 40.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A fishing bait holding apparatus comprising:
 a container having a bottom wall and a perimeter wall being attached to and extending upwardly from said bottom wall, said perimeter wall having an upper edge defining an access opening into said container;
 a liner being removably positioned within said container, said liner having a lower wall and a peripheral wall being attached to and extending upwardly from said lower wall, said lower and peripheral walls each including an outer layer enclosing an interior space, a fluid being positioned within said interior space, wherein said fluid may be chilled and said liner placed in said container to cool an area enclosed by said container;

a lid being removably positioned on said container and releasably engaging said upper edge to close said access opening, said lid having a plurality of air apertures extending therethrough;

a panel being pivotably coupled to said lid, said panel being coupled to a top surface of said lid, said panel being positionable in a closed position covering said air apertures and in an open position exposing said air apertures, said panel rotating about said lid to move said panel between the open and closed positions, said panel being free to rotate in a complete circle on said lid with respect to said top surface of said lid; and wherein said container can be cooled with said liner such that fishing bait positioned in said container are cooled by said liner.

2. The apparatus according to claim 1, wherein said lower wall has a size and shape to abut and cover said bottom wall such that said peripheral wall abuts and is coextensive with an inner surface of said perimeter wall.

3. The apparatus according to claim 1, further including a handle being coupled to said container.

4. The apparatus of claim 1, further comprising a pair of gripping portions coupled to and extending upwardly from said panel, said gripping portions being configured to facilitate rotation of said panel relative to said lid.

5. A fish bait holding apparatus comprising:

a container having a bottom wall and a perimeter wall being attached to and extending upwardly from said bottom wall, said perimeter wall having an upper edge defining an access opening into said container;

a liner being removably positioned within said container, said liner being unattached to container, said liner having a lower wall and a peripheral wall being attached to and extending upwardly from said lower wall, said lower and peripheral walls each including an outer layer enclosing an interior space, a fluid being positioned within said interior space, wherein said fluid may be chilled and said liner placed in said container to cool an area enclosed by said container, said lower wall having a size and a shape to abut and cover said bottom wall such that said peripheral wall abuts and is coextensive with an inner surface of said perimeter wall;

a lid being removably positioned on said container and releasably engaging said upper edge to close said access opening, said lid having a plurality of air apertures extending therethrough;

a panel being pivotably coupled to said lid, said panel being coupled to a top surface of said lid, said panel being positionable in a closed position covering said air apertures, said panel being positionable in an open position exposing said air apertures, said panel rotating about said lid to move said panel between the open and closed positions, said panel being free to rotate in a complete circle on said lid with respect to said to surface of said lid;

a pair of gripping portions coupled to and extending upwardly from said panel, said gripping portions being configured to facilitate rotation of said panel relative to said lid;

a handle being coupled to said container; and wherein said container can be cooled with said liner such that fishing bait positioned in said container are cooled by said liner.

* * * * *